(12) United States Patent
Forster

(10) Patent No.: US 7,307,527 B2
(45) Date of Patent: Dec. 11, 2007

(54) RFID DEVICE PREPARATION SYSTEM AND METHOD

(75) Inventor: Ian J. Forster, Chelmsford (GB)

(73) Assignee: Avery Dennison Corporation, Pasadena, CA (US)

(*) Notice: Subject to any disclaimer, the term of this patent is extended or adjusted under 35 U.S.C. 154(b) by 270 days.

(21) Appl. No.: 10/882,947

(22) Filed: Jul. 1, 2004

(65) Prior Publication Data

US 2006/0000907 A1    Jan. 5, 2006

(51) Int. Cl.
*G08B 13/14* (2006.01)

(52) U.S. Cl. .................... 340/572.1; 235/449

(58) Field of Classification Search ............ 340/572.1, 340/572.7, 572.8; 235/449, 450
See application file for complete search history.

(56) References Cited

U.S. PATENT DOCUMENTS

| | | | |
|---|---|---|---|
| 3,579,113 A * | 5/1971 | Jabbar et al. ............ | 455/193.3 |
| 4,872,018 A * | 10/1989 | Feltz et al. ................. | 343/742 |
| 4,876,535 A | 10/1989 | Ballmer et al. | |
| 5,153,983 A | 10/1992 | Oyama | |
| 5,430,441 A | 7/1995 | Bickley et al. | |
| 5,545,291 A | 8/1996 | Smith et al. | |
| 5,557,085 A | 9/1996 | Tyren et al. | |
| 5,564,888 A | 10/1996 | Doan | |
| 5,621,199 A | 4/1997 | Calari et al. | |
| 5,767,789 A * | 6/1998 | Afzali-Ardakani et al. | 340/10.1 |
| 5,781,110 A | 7/1998 | Habeger, Jr. et al. | |
| 5,783,856 A | 7/1998 | Smith et al. | |
| 5,824,186 A | 10/1998 | Smith et al. | |
| 5,854,480 A | 12/1998 | Noto | |
| 5,880,695 A | 3/1999 | Brown et al. | |
| 5,904,545 A | 5/1999 | Smith et al. | |
| 5,983,363 A | 11/1999 | Tuttle et al. | |
| 6,001,211 A | 12/1999 | Hiroyuki | |
| 6,052,093 A | 4/2000 | Yao et al. | |
| 6,078,259 A | 6/2000 | Brady et al. | |
| 6,100,804 A | 8/2000 | Brady et al. | |
| 6,104,291 A * | 8/2000 | Beauvillier et al. ...... | 340/572.1 |
| 6,107,920 A | 8/2000 | Eberhardt et al. | |
| 6,121,880 A | 9/2000 | Scott et al. | |
| 6,122,492 A | 9/2000 | Sears | |
| 6,130,612 A | 10/2000 | Castellano et al. | |

(Continued)

FOREIGN PATENT DOCUMENTS

DE    101 20 625    4/2001

(Continued)

*Primary Examiner*—John Tweel, Jr.
(74) *Attorney, Agent, or Firm*—Renner, Otto, Boisselle & Sklar, LLP

(57) ABSTRACT

An RFID device preparation system includes a printer combined with a short-range tester/reader. The tester/reader operatively couples to the RFID device using capacitive and/or magnetic coupling. By use of capacitive and/or magnetic coupling, good read characteristics may be obtained, while obtaining excellent discrimination between various RFID devices that may be in or near the tester/reader. Thus, RFID devices may be inexpensively and reliably tested one at a time, without appreciable interference or effect due to the presence of other RFID devices. The tester/reader may include electric-field and/or magnetic-field coupling elements that are configured to receive different signals, in order to test a variety of configurations of RFID devices. This may enable the device preparation system to accommodate various types and configurations of RFID devices, increasing versatility of the system.

39 Claims, 3 Drawing Sheets

U.S. PATENT DOCUMENTS

| | | | |
|---|---|---|---|
| 6,145,901 A | 11/2000 | Rich | |
| 6,147,605 A | 11/2000 | Vega et al. | |
| 6,172,609 B1 | 1/2001 | Lu et al. | |
| 6,181,287 B1 | 1/2001 | Beigel | |
| 6,204,764 B1 | 3/2001 | Maloney | |
| 6,206,292 B1 | 3/2001 | Robertz et al. | |
| 6,219,543 B1 | 4/2001 | Myers et al. | |
| 6,236,316 B1 | 5/2001 | Eberhardt et al. | |
| 6,246,326 B1 | 6/2001 | Wiklof et al. | |
| 6,265,977 B1 | 7/2001 | Vega et al. | |
| 6,274,508 B1 | 8/2001 | Jacobsen et al. | |
| 6,281,038 B1 | 8/2001 | Jacobsen et al. | |
| 6,291,896 B1 | 9/2001 | Smith | |
| 6,316,278 B1 | 11/2001 | Jacobsen et al. | |
| 6,380,729 B1 | 4/2002 | Smith | |
| 6,384,727 B1 * | 5/2002 | Diprizio et al. | 340/572.7 |
| 6,392,544 B1 | 5/2002 | Collins et al. | |
| 6,404,339 B1 | 6/2002 | Eberhardt | |
| 6,407,665 B2 | 6/2002 | Maloney | |
| 6,415,978 B1 | 7/2002 | McAllister | |
| 6,417,025 B1 | 7/2002 | Gengel | |
| 6,446,208 B1 | 9/2002 | Gujar et al. | |
| 6,451,154 B1 | 9/2002 | Grabau et al. | |
| 6,480,086 B1 | 11/2002 | Kluge et al. | |
| 6,487,681 B1 | 11/2002 | Tuttle et al. | |
| 6,542,114 B1 | 4/2003 | Eagleson et al. | |
| 6,545,605 B2 | 4/2003 | Van Horn et al. | |
| 6,600,420 B2 | 7/2003 | Goff et al. | |
| 6,611,199 B1 | 8/2003 | Geiszler et al. | |
| 6,621,410 B1 * | 9/2003 | Lastinger et al. | 340/10.42 |
| 6,624,362 B2 | 9/2003 | Müller | |
| 6,665,193 B1 | 12/2003 | Chung et al. | |
| 6,677,852 B1 | 1/2004 | Landt | |
| 6,683,254 B1 | 1/2004 | Gunnels | |
| 6,848,616 B2 * | 2/2005 | Tsirline et al. | 235/449 |
| 6,891,474 B1 * | 5/2005 | Fletcher | 340/572.1 |
| 7,265,977 B2 | 9/2007 | Martin et al. | |
| 2001/0006368 A1 | 7/2001 | Maloney | |
| 2001/0053675 A1 | 12/2001 | Plettner | |
| 2001/0054755 A1 | 12/2001 | Kirkham | |
| 2002/0035701 A1 | 3/2002 | Casebolt et al. | |
| 2002/0145520 A1 | 10/2002 | Maloney | |
| 2004/0041262 A1 | 3/2004 | Okamoto et al. | |
| 2004/0100413 A1 | 5/2004 | Walder | |
| 2004/0160233 A1 | 8/2004 | Forster | |
| 2004/0178267 A1 | 9/2004 | Tsirline et al. | |

FOREIGN PATENT DOCUMENTS

| | | |
|---|---|---|
| EP | 1 039 543 | 3/2000 |
| EP | 0896706 | 6/2000 |
| EP | 1 086 444 | 2/2003 |
| JP | 2004187159 | 7/2004 |
| JP | 2004206479 | 7/2004 |
| JP | 2004206512 | 7/2004 |
| WO | 82/00541 | 2/1982 |
| WO | WO 93/05489 | 3/1993 |
| WO | 00/16277 | 3/2000 |
| WO | WO 00/16280 | 3/2000 |
| WO | WO 00/41148 | 7/2000 |
| WO | 00/45353 | 8/2000 |
| WO | 00/49648 | 8/2000 |
| WO | WO 01/25817 | 4/2001 |
| WO | WO 01/73864 | 4/2001 |
| WO | 01/50547 | 7/2001 |
| WO | 01/71686 | 9/2001 |
| WO | WO 01/67412 | 9/2001 |
| WO | 01/75832 | 10/2001 |
| WO | WO 01/80174 | 10/2001 |
| WO | 02/25825 | 3/2002 |
| WO | 02/097723 | 12/2002 |
| WO | 03/056509 | 7/2003 |
| WO | 03/068874 | 8/2003 |
| WO | 2004/030148 | 9/2003 |
| WO | 2004/044834 | 5/2004 |
| WO | 2004/046762 | 6/2004 |
| WO | 2004/053721 | 6/2004 |
| WO | WO 2004/072892 | 8/2004 |

* cited by examiner

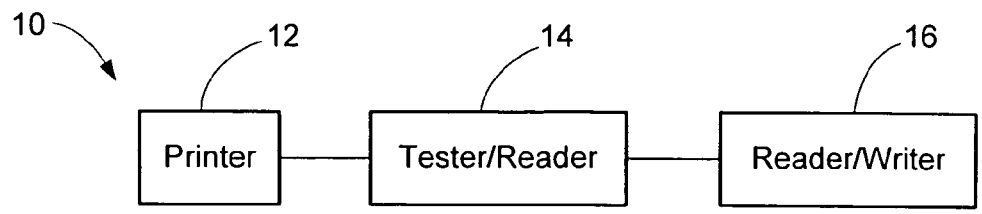
FIG. 1
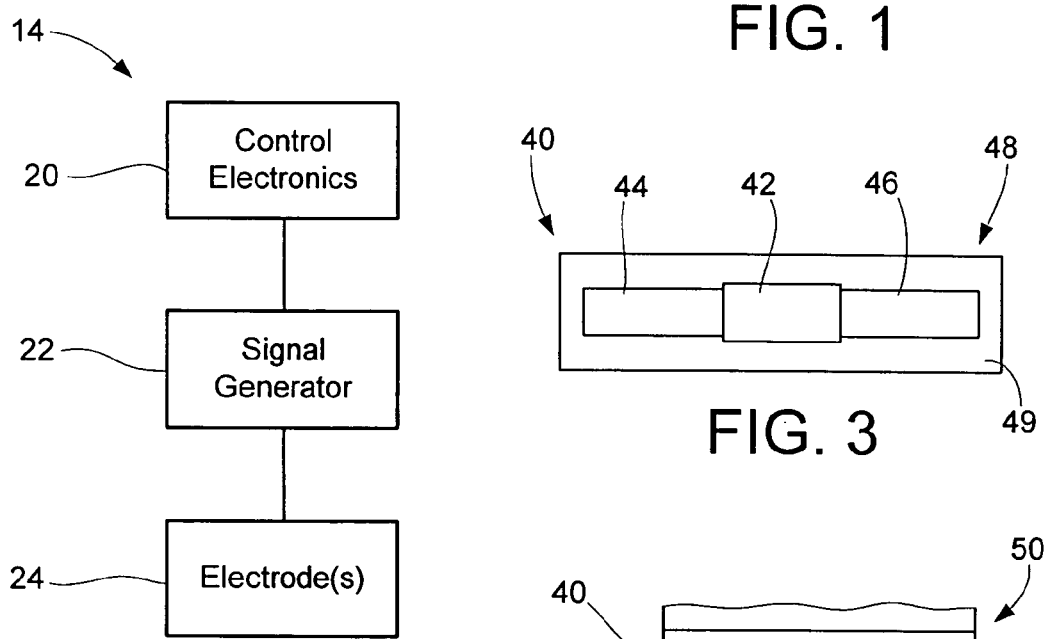
FIG. 2
FIG. 3
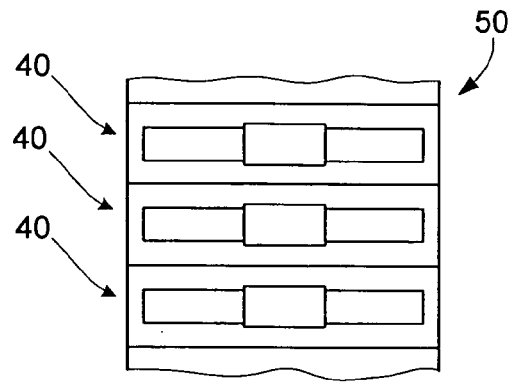
FIG. 4
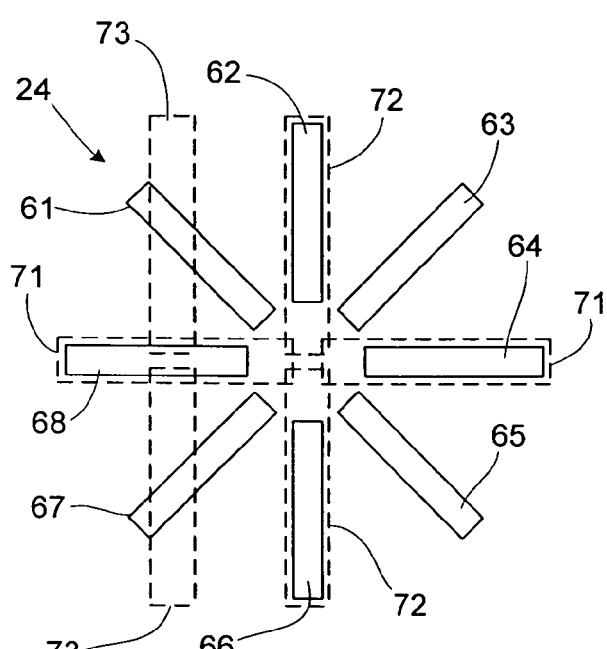
FIG. 5
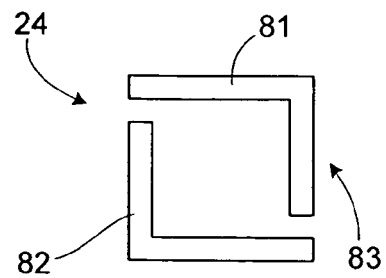
FIG. 6

RFID DEVICE PREPARATION SYSTEM AND METHOD

BACKGROUND OF THE INVENTION

1. Technical Field

The invention relates to systems and methods for preparing RFID devices.

2. Background of the Related Art

Radio frequency identification (RFID) tags and labels (collectively referred to herein as "devices") are widely used to associate an object with an identification code. RFID devices generally have a combination of antennas and analog and/or digital electronics, which may include for example communications electronics, data memory, and control logic. For example, RFID tags are used in conjunction with security-locks in cars, for access control to buildings, and for tracking inventory and parcels. Some examples of RFID tags and labels appear in U.S. Pat. Nos. 6,107,920, 6,206,292, and 6,262,292, all of which are hereby incorporated by reference in their entireties.

As noted above, RFID devices are generally categorized as labels or tags. RFID labels are RFID devices that are adhesively or otherwise have a surface attached directly to objects. RFID tags, in contrast, are secured to objects by other means, for example by use of a plastic fastener, string or other fastening means.

RFID devices include active tags and labels, which include a power source, and passive tags and labels, which do not. In the case of passive tags, in order to retrieve the information from the chip, a "base station" or "reader" sends an excitation signal to the RFID tag or label. The excitation signal energizes the tag or label, and the RFID circuitry transmits the stored information back to the reader. The "reader" receives and decodes the information from the RFID tag. In general, RFID tags can retain and transmit enough information to uniquely identify individuals, packages, inventory and the like. RFID tags and labels also can be characterized as to those to which information is written only once (although the information may be read repeatedly), and those to which information may be written during use. For example, RFID tags may store environmental data (that may be detected by an associated sensor), logistical histories, state data, etc.

As the price of RFID devices goes down, such devices are used in a wider variety of applications. It may be desirable for some applications to put individualized visual information on the RFID device. To that end, the RFID device may include or be coupled to a label that may be printed with visual information. The visual information may be machine-readable information, or may be information intended for identification and reading by a person. An example of a system for printing information on an RFID label is the system described in International Publication No. WO 02/35463, which is incorporated by reference in its entirety.

Some effort has been made in prior systems to provide encoding or programming of an RFID device in conjunction with a printing operation. Examples of such systems are those described in U.S. Pat. Nos. 6,246,326 and 6,593,853. Notwithstanding these prior devices and methods, improvements would be desirable with regard to combining printing operations with interaction with an RFID device.

SUMMARY OF THE INVENTION

According to an aspect of the invention, a system for preparing RFID devices includes a tester/reader that interacts with RFID devices through reactive coupling. The reactive coupling may be capacitive, magnetic, or a combination of both. The system may also include a printer for printing on a facestock or other layers of the RFID devices. The RFID devices may be on a roll or sheet having multiple such devices. The tester/reader may have multiple electric-field coupling elements and/or magnetic-field coupling elements, to accommodate different possible orientations of the RFID devices relative to the tester/reader. For example, the tester/reader may have multiple electrodes, such as L-shape or other non-straight electrodes Alternatively, the tester/reader may have a partially-resistive electrode with multiple drive points that may be driven with AC signals of different amplitudes and/or phases. The partially-resistive electrode may be substantially rectangular, with drive points at the corners. As another alternative, the tester/reader may have one or more magnetic-field coupling elements such as coils.

According to another aspect of the invention, an RFID device preparation system includes a tester/reader for interacting with a plurality of RFID devices on a sheet or roll; and a printer for printing on a layer of the RFID devices. The tester/reader interacts with the RFID devices through reactive coupling.

According to yet another aspect of the invention, a tester/reader for interacting with a plurality of RFID devices on a sheet or roll, wherein the tester/reader includes: one or more electric-field coupling elements for interacting with the RFID devices through capacitive coupling; and a signal generator coupled to the one or more electric-field coupling elements. The one or more electric-field coupling elements are configured for capacitively interacting with the RFID devices in any of a variety of orientations relative to the tester/reader.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, which are not necessarily to scale:

FIG. 1 is a block diagram of an RFID device preparation system in accordance with the present invention;

FIG. 2 is a block diagram of a tester/reader of the RFID device preparation system of FIG. 1;

FIG. 3 is a plan view of a portion of an RFID device to be prepared by the system of FIG. 1;

FIG. 4 is a plan view showing a web or sheet containing multiple of the RFID devices of FIG. 3;

FIG. 5 is a plan view showing a first electrode configuration that may be utilized in the tester/reader of FIG. 2, for capacitively coupling to an RFID device for reading and/or testing the device;

FIG. 6 is a plan view showing a second electrode configuration that may be utilized in the tester/reader of FIG. 2, for capacitively coupling to an RFID device for reading and/or testing the device;

DETAILED DESCRIPTION

Figure 7:
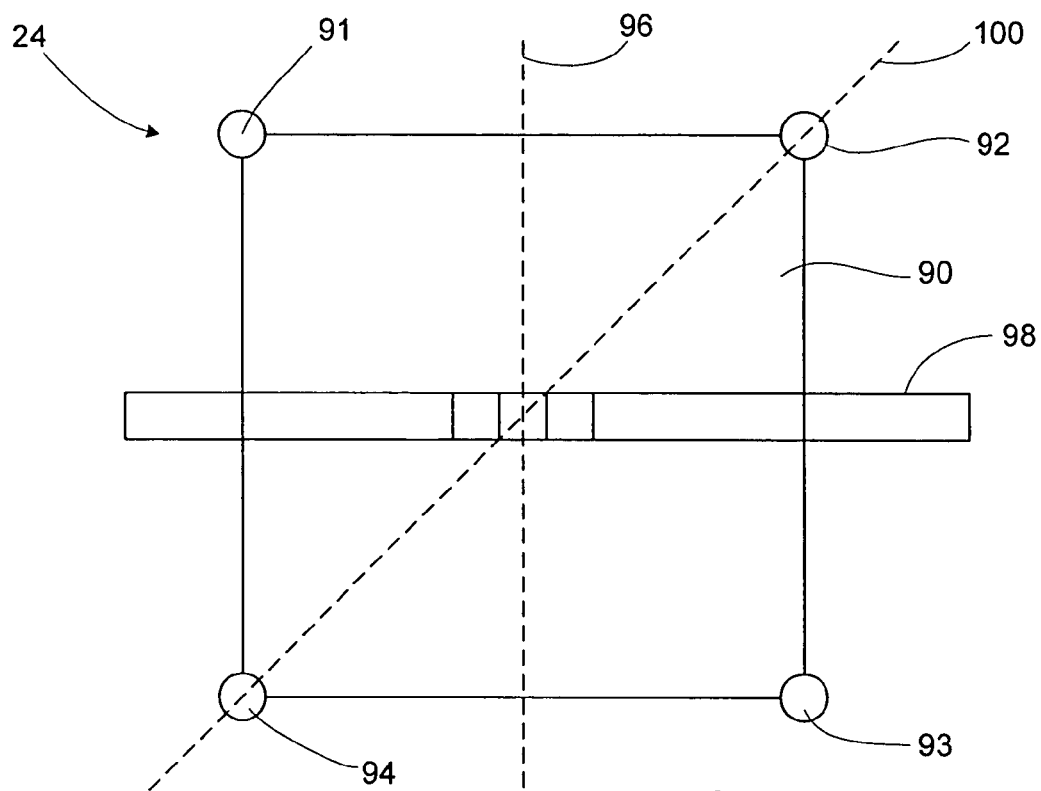
FIG. 7 is a plan view showing a third electrode configuration that may be utilized in the tester/reader of FIG. 2, for capacitively coupling to an RFID device for reading and/or testing the device.

The power may be used by the chip 42 to send a return signal via the antenna elements 44 and 46. The return signal generated by the RFID device 40 is transmitted from the antenna elements 44 and 46 to the coupling elements, the electrodes 24. It will be appreciated that the sending of the return signal may be a passive process, rather than active transmission of a return signal by the RFID device 40. As one example, circuitry in the chip 42 may be used to modulate impedance of the RFID device 40. As another example, the RFID device 40 may reflect the incident signal back to the tester/reader 14.

An RFID device preparation system includes a printer combined with a short-range tester/reader. The tester/reader operatively couples to the RFID device using capacitive and/or magnetic coupling. By use of capacitive and/or magnetic coupling, good read characteristics may be obtained, while obtaining excellent discrimination between various RFID devices that may be in or near the tester/reader. Thus, RFID devices may be inexpensively and reliably tested one at a time, without appreciable interference or effect due to the presence of other RFID devices. The tester/reader may include electric-field and/or magnetic-field coupling elements that are configured to receive different signals, in order to test a variety of configurations of RFID devices. This may enable the device preparation system to accommodate various types and configurations of RFID devices, increasing versatility of the system.

Turning now to FIG. 1, an RFID device preparation system 10 includes a printer 12, a tester/reader 14, and, optionally, a reader/writer 16. All of the parts of the RFID device preparation system 10 may be included in a single housing. Alternatively, the parts of the system 10 may be placed in close proximity to one another. The printer 12 may be used to print text, graphics, or identifying indicia on the RFID tag or label. An example of a system for printing RFID tags or labels may be found in U.S. Pat. No. 6,246,326.

The tester/reader 14 provides a way to quickly test operation of an RFID device. The tester/reader 14 may have a short-range reactive coupling mechanism, such as capacitive and/or magnetic coupling between the tester/reader 14 and the RFID device.

The optional reader/writer 16 may be used to program the RFID device. The reader/writer 16, if present, may also have a short-range coupling mechanism such as capacitive and/or magnetic coupling. Indeed, the tester/reader 14 and the reader/writer 16 may be combined into a single element or structure, that both tests and writes to (programs) the RFID device. The reader/writer 16 may have a longer time in communication with the RFID device, compared with the tester/reader 14. A longer communication time may be necessary because programming of the RFID device may require more interaction and communication than merely testing operation of the RFID device.

Referring now to FIG. 2, the tester/reader 14 may have control electronics 20, a signal generator 22, and one or more electric-field coupling elements, such as electrodes 24. The control electronics 20 provide guidance to the signal generator 22 as to what sort of signals are to be transmitted by the electrodes 24. The control electronics 20 may store information regarding different types of tags, and/or different orientations of tags that are possible. Information may be entered into the control electronics 20 regarding the types and/or orientations of RFID devices to be encountered by the system 10. Depending on the type and/or orientation of RFID devices, the signals generated by the signal generator 22 to the one or more electrodes 24 may be configured to test and/or read the RFID devices. The tester/reader 14 may also be configured to detect the response of the RFID device, for example, thereby determining whether the RFID device is functioning properly. It will be appreciated that the tester/reader 14 may have other suitable components for performing operations.

Capacitive coupling and/or magnetic coupling are referred to collectively herein as "reactive coupling," in contrast to direct electrical coupling by electrically conductive material. In such reactive coupling, signals from the signal generator 22 may be coupled between overlapping regions of an RFID device and the electrodes 24 of the tester/reader 14. References herein to capacitive, magnetic, or reactive coupling refer to coupling that is predominantly or primarily capacitive, magnetic, or reactive. It will be appreciated that coupling that is primarily capacitive may also include some inductive (magnetic) coupling as a secondary coupling mechanism. Conversely, coupling that is primarily magnetic may also include some capacitive coupling. Systems using primarily capacitive or magnetic coupling are referred to herein as utilizing reactive coupling. Capacitive, magnetic, or reactive coupling, as the terms are used herein, may also include some direct conductive coupling, albeit not as the primary type of electrical coupling.

Devices or elements for capacitive coupling are referred to herein as electric-field coupling devices or elements. Similarly, devices or elements for magnetic coupling are referred to herein as magnetic-field coupling devices or elements. Collectively, electric-field coupling devices or elements and magnetic-field coupling devices or elements are referred to as reactive coupling devices or elements.

FIG. 3 shows one type of RFID device that may be read, tested, and/or programmed by the RFID device preparation system 10 (FIG. 1). The RFID device 40 shown in FIG. 3 has a transponder or RFID chip 42 operatively coupled to antenna elements 44 and 46 of the dipole antenna 48. The RFID device 40 may be a part of other device such as tags or labels. The tag or label may have a printable face stock for printing, by the printer 12 (FIG. 1), visual identifiers or other information thereupon.

The chip 42 may include any of a variety of suitable electronic components, such as the circuitry described above for modulating the impedance of the RFID device 40. It will be appreciated that alternatively the antenna 48 may have another layout. The antenna elements 44 and 46 may be mounted on a dielectric substrate 49 of the RFID device 40.

As shown in FIG. 4, the RFID device 40 may be part of a roll or web 50 of multiple of such devices. The dielectric substrate 49 of the RFID device 40 may be part of a sheet of dielectric material, such as a roll of dielectric material, upon which other RFID devices are formed. It will be appreciated that the configuration of the RFID devices 40 relative to the roll or web 50 may be in a wide variety of suitable orientations. Further, it will be appreciated that there may be any of a wide variety of spacings between the RFID devices, for example, with areas between the RFID devices 40 filled with other parts of tags or labels, such as printable portions of tags or labels.

FIG. 5 shows one configuration for the electrodes 24 of the tester/reader 14. The electrodes 61-68 shown in FIG. 5 are configured for capacitive coupling with an RFID device such as the dipole antenna RFID device 40 (FIG. 3). The signal generator 22 (FIG. 2) may be configured to send various appropriate signals to some of the electrodes 61-68, to allow coupling of RFID devices in various configurations relative to the electrodes 61-68.

Three examples of possible locations for the RFID device 40 are indicated by reference numbers 71, 72, and 73 in FIG. 5. An RFID device in position 71 may be capacitively read by inputting a signal to the electrode 64, and a corresponding signal, 180 degrees out of phase, to the electrode 68. For an RFID device in a vertical orientation, indicated by reference number 72 in FIG. 5, out-of-phase AC signals may be sent to the electrodes 62 and 66. For an RFID device in an offset position, such as the position indicated by reference 73 in FIG. 5, out-of-phase AC signals may be sent to a pair of the diagonal electrodes, such as the electrodes 61 and 67. It will be appreciated that a wide variety of other configurations of an RFID device 40 relative to the electrodes 24 may be suitably read by choosing the electrodes to which signals are sent.

The control electronics 20 (FIG. 2) may be utilized to suitably direct signals to appropriate of the electrodes 61-68. Information concerning the configuration of RFID devices 40 on the roll 50 (FIG. 4) may be transmitted to the RFID device preparation system 10 (FIG. 1) by any of a variety of suitable ways. For example, information may be encoded at the beginning or otherwise as a part of the roll 50. As another example, information on the configuration of the RFID devices 40 and/or information on the signals to be sent to the electrodes 61-68 may be entered into the RFID device preparation system 10 by other methods. It may be possible to encode such information in an additional RFID device placed, for example, at the beginning of the roll 50.

The RFID device tester/reader 14 and the RFID device 40 may be capacitively coupled together, to transfer power and/or signals between the RFID device tester 14 and the RFID device 40. The operative electrodes of the electrodes 61-68 may be operatively coupled to the antenna elements 44 and 46 (FIG. 3). The antenna elements 44 and 46 and the operative electrodes may function as plates of capacitors, enabling the capacitive coupling between the RFID device tester/reader 14 and the RFID device 40.

Once the RFID device tester/reader 14 and the RFID device 40 are capacitively coupled together, electrical power and/or signals may be transferred between the two. The tester/reader 14 may send an outgoing signal, such as an outgoing AC signal, to a pair of the electrodes 61-68. AC power received by the antenna elements 44 and 46 may be rectified by the chip 42, for instance by transistors and/or diodes that are part of the chip 42, to produce DC power to run the chip 42.

The power may be used by the chip 42 to send a return signal via the antenna elements 44 and 46. The return signal generated by the RFID device 40 is transmitted from the antenna elements 44 and 46 to the coupling elements, the electrodes 24. It will be appreciated that the sending of the return signal may be a passive process, rather than active transmission of a return signal by the RFID device 40. As one example, circuitry in the chip 42 may be used to modulate impedance of the RFID device 40. As another example, the RFID device 40 may reflect the incident signal back to the tester/reader 14.

It will be appreciated that the RFID device 40 either may be a passive device that automatically responds to an incident signal, or may be an active device that only responds to incident signals conforming to certain protocols. The RFID device 40 may also have other components, such as its own power supply.

It will be further appreciated that the functioning of the RFID device 40 may be substantially the same as if incident energy was provided by a long-range RF field, rather than by capacitive coupling. Alternatively, the functioning of the RFID device 40 may be different, depending upon how the incident energy is provided to it.

The tester/reader 14 is able to interpret the return signal received from the RFID device 40 to confirm proper function of all or part of the RFID device 40, such as correct functioning of the antenna 48 and/or the chip 42. The confirming of proper functioning may include merely detecting the presence of the RFID device 40, such that if the RFID device 40 is detectable at all, functioning of the RFID device 40 is acceptable, and the RFID device 40 passes the test. Alternatively, the test may involve evaluation of the return signal received from the RFID device 40, for example to determine if the return signal conforms to one or more parameters or ranges of parameters. As another alternative, a successful test may involve confirmation of success in programming the RFID chip 42 and/or sending information to the RFID chip 42 for storage in the RFID chip 42. It will be appreciated that other tests of operation of the RFID device 40 may be employed, for example diagnosing faults of the RFID device 40 or otherwise qualitatively evaluating performance of the RFID device 40.

The outgoing AC power signal sent out by the tester/reader 14 and the return signal generated by the RFID device 40 have been described above for clarity as separate signals, one sent out by the tester/reader 14, and the other received by the tester/reader 14. In actuality, it will be appreciated that the signals may in fact be superimposed upon one another, in that the tester/reader 14 perceives a superposition of the outgoing signal and the return signal. Therefore the interpretation of the return signal by the tester/reader 14 may involve a comparison between the outgoing signal and the signal perceived by the tester/reader 14, a superposition of the outgoing signal and the return signal.

The RFID device tester/reader 14, which capacitively couples to the RFID device 40, advantageously allows short-range coupling between tester/reader 14 and RFID device 40. As noted above, the RFID device 40 may be part of a sheet or roll having many RFID devices thereupon, and by using short-range capacitive coupling between the RFID device tester/reader 14 and the RFID device 40, better testing of the RFID device 40 may be accomplished, compared with testers coupling to RFID devices via RF fields sent over free space. One reason for the advantage of the capacitively-coupling RFID device tester/reader 14 is that the short-range capacitive coupling is less prone to provide energy to other RFID devices on the same roll or sheet. By reducing or limiting the providing of energy to RFID devices other than the RFID device 40 to be tested, there is better discrimination in the testing, and thus improved testing of the RFID device 40.

Appropriate selection of the frequency of the outgoing signal from the tester/reader 14 may allow further reduction in undesired coupling to RFID devices other than the RFID device 40 that is being tested. In explaining this further, it will be useful to define a natural resonant frequency of the antenna 48 as the frequency at which the antenna 48 best receives energy from an external RF field, and at which it best sends energy, when not located in close proximity to the RFID device tester/reader 14. This natural resonant frequency is the frequency at which an antenna impedance of the antenna 48 is the complex conjugate of a chip impedance of the chip 42. The resonant frequency is also referred to herein as the optimum operating point or optimum operating frequency of the RFID device 40. It will be appreciated that the resonant frequency of the antenna 48 may be highly dependent on the configuration of the antenna 48.

One advantage of the RFID device tester/reader 14, which capacitively couples to the RFID device 40, is that the outgoing power signal from the tester/reader 14 may be at a frequency that is different from the natural resonant frequency of the antenna 48 of the RFID device 40 (different from the natural optimum operating point of the RFID device 40). By having the outgoing power signal at a different frequency from the natural resonant frequency for the antenna 48 of the RFID device 40, longer-range coupling may be minimized of the outgoing signals to RFID devices other than the desired RFID device 40 to be tested. This is because antennas of the RFID devices are less susceptible to receive significant amounts of power at frequencies different from the resonant frequency of the antenna 48. Further, having the outgoing power signal at a different frequency than the natural resonant frequency of the antenna 48 may reduce cross-coupling between the various antennas of various RFID devices on the same roll or sheet.

The operating frequency of the RFID device tester/reader 14 may be selected so as to provide sufficient energy to activate the RFID device 40 that is being tested, and avoiding providing substantial amounts of energy to other RFID devices that may otherwise produce signals interfering with test results. As suggested by the above discussion, the tester operating frequency may be different from the natural resonant frequency of the antenna 48, and/or may be substantially the same as the new resonant frequency of the antenna 48 (the resonant frequency of the antenna 48 as shifted due to its proximity to the RFID device tester/reader 14).

Alternatively, the tester operating frequency may be selected from a broad range of suitable RF frequencies for operatively coupling the tester/reader 14 and the RFID device 40. The RF frequencies utilized may be greater than or less than the antenna natural frequency and/or the new antenna resonant frequency (shifted due to the proximity of the tester/reader 14 to the RFID device 40). It will be appreciated, however, that RF frequencies that stray too far from the new antenna resonant frequency (shifted optimum operating frequency) may be unsuitable. For example, there may be a lower limit for suitable RF frequencies due to increases in impedance of capacitive paths, for a given coupling area, as frequencies are reduced. This increase in impedance may make it more difficult to send power into the chip. As another example of a reason for a lower frequency limit, there may be an integrating filter downstream of internal rectifiers in the chip 42, to aid in creating the DC power supply to run the chip 42. If the frequency of the incident RF energy received from the tester/reader 14 is too low, the filter may be unable to adequately smooth the rectified waveform output from the rectifiers. The result may be an unacceptable DC power supply for the chip 42.

Further details concerning capacitive coupling and communication between tester/readers and RFID chips may be found in commonly-assigned U.S. patent application Ser. No. 10/367,515, filed Feb. 13, 2003, and International Application No. PCT/US04/04227, filed Feb. 13, 2004. Both of these applications are hereby incorporated by reference in their entireties.

The results of testing of the RFID device 40 by the tester/reader 14 may be used to determine whether or what to print on facestock or other printable layer of the RFID device 40. If the RFID device 40 is successfully tested, the printer (FIG. 1) may be configured to print suitable identifying or information on the facestock. If the RFID device 40 fails testing, the printer 12 may be configured to either not print on the facestock or to print some indication (such as an "X") indicating that the RFID device 40 is not to be used.

FIG. 6 shows another configuration for the electrodes 24, which also may be used in capacitively coupling the electrodes 24 to RFID devices 40 in any of a variety of orientations. The electrodes 24 shown in FIG. 6 include a pair of L-shaped electrodes 81 and 82 that are configured to combine to form a substantially rectangular RFID device reading area 83.

It will be appreciated that the electrodes 81 and 82 may have other suitable shapes to cover different orientations of RFID devices in the area 83, which may be a rectangular area. The sizes and configurations of the electrodes 81 and 82 may be selected so as to cover a large reading area and/or a large variety of possible orientations of the RFID device 40, while also maintaining desired selectivity between the various RFID devices 40 on the web or sheet 50 (FIG. 4). That is, the size and shape of the electrodes 81 and 82 may be selected so as to allow testing of individual RFID devices, one at a time. To that end, it may be desirable to have the electrodes 81 and 82 be sized to be smaller than the spacing between adjacent of the RFID devices 40 on the sheet or web 50.

Turning now to FIG. 7, another possible electrode configuration 24 is shown. The configuration shown in FIG. 7 includes a partially-resistive material 90, with drive points 91-94 at corners of the partially-resistive material 90. The partially-resistive material 90 may have a resistivity of 50 ohms/square, although it will be appreciated that the material may have a different resistivity. RF signals of controllable phase and amplitude may be introduced at the drive points 91-94. By controlling the phase and amplitude of signals at the drive points 91-94, defined current flows may be created in the partially-resistive material 90. As the material 90 is partially resistive, appropriate driving by placing signals at the drive points 91-94 can create voltage profiles, which can couple to test an RFID device via an electric field (capacitive testing), by a magnetic field, or by a combination of both.

For example, drive points 91 and 94 are driven by a signal with a relative amplitude of 1 and a relative phase of 0°, and drive points 92 and 93 are driven by a signal of relative amplitude 1 and a relative phase of 180°. This driving would create a line of zero voltage along the center of the material 90, indicated in FIG. 7 by reference number 96. An RFID device centered along the line 96 and perpendicular to the line 96, indicated by the position 98 shown in FIG. 7, would be read as long as a center region of the RFID device traverses the line 96.

As another example, if signals of the same relative amplitude, but 180° out of phase, are provided to drive points 91 and 93, a line of zero voltage may be created diagonally across the material 90. This line is indicated by reference number 100 in FIG. 7. By changing the termination impedance and/or driving inputs at the other drive points 92 and 93, the angle and shape of the voltage/current profiles may be controlled.

It will be appreciated that by varying the relative amplitude of the driving signals at the drive points 91-94, the position of a read line may be varied across different parts of the partially-resistive material 90. It will also be appreciated that the electrode configuration 24 shown in FIG. 7 provides a way of obtaining continuously variable amplitudes and read angles across the tester/reader 14. As stated above, coupling may be via either electric field or by magnetic field generated by the current flow, or a combination of the two.

The electrode configurations shown in FIGS. 5-7 may couple to RFID devices primarily by an electric field induced across a parallel plate capacitor formed by proximity and overlap between the tester/reader 14 and the RFID device 40 under test.

Figure 8:
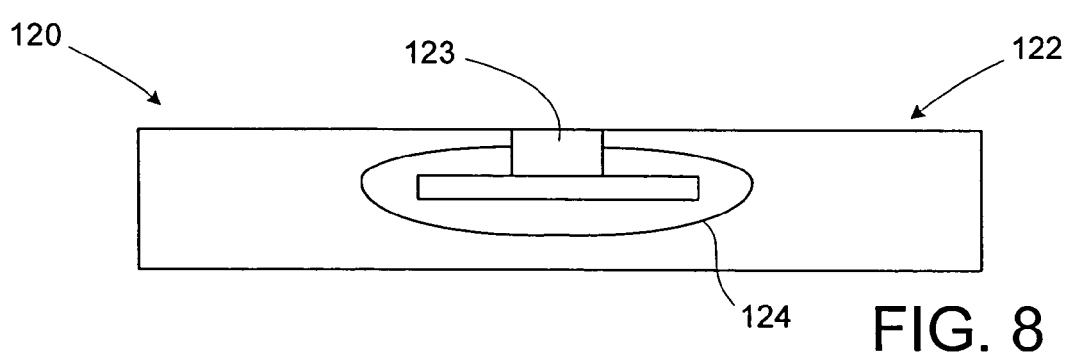
FIG. 8 is a plan view of an RFID device that may be magnetically coupled to be tested and/or read by the tester/reader of FIG. 2.
Figure 9:
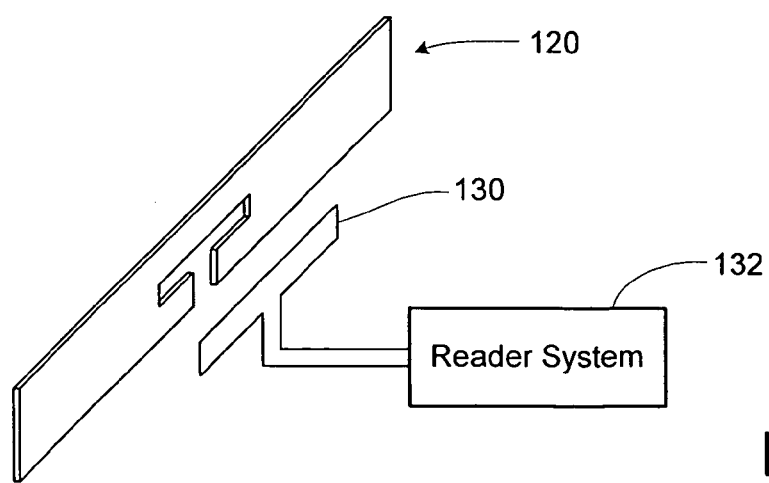
FIG. 9 is a conceptual view of magnetic coupling between the RFID device of FIG. 8 and the tester/reader of FIG. 2.

FIG. 8 shows an RFID device 120 that includes an antenna 122 coupled to a transponder chip 123. The antenna 122 has a conductive path 124 that acts as an inductor. As illustrated in FIG. 9 a coil 130 coupled to a reader 132 may be used as a magnetic field coupling device or element to magnetically couple to the antenna 122. The coil 130 may be a single-turn coil or a multi-turn coil.

Magnetic coupling decays in proportion to the third power with distance between the coil 130 and the RFID device 120. This allows magnetic coupling to be suitable for short-range coupling for coupling together one of a number of closely spaced RFID devices to the reader.

It is possible to use both magnetic and capacitive coupling simultaneously, for example, by using different coupling elements for each. The magnetic and capacitive coupling may be configured to operate either additively at a position, or antagonistically, by controlling the relative phase and amplitude of the signals induced by the two modes. By controlling operation of the magnetic and capacitive coupling in such a manner, very precise control may be had regarding read location for the reader/tester. This may be useful for reading/testing small RFID devices. For instance, using electrical field and magnetic field signals opposite in phase, the capacitive coupling and the magnetic coupling may be made to cancel out except at a precise location, such as a null location where the magnetic filed coupling substantially drops to zero. Such a null point may occur when an RFID device passes directly over a magnetic-field coupling element that is substantially orthogonal to the magnetic-field coupling element.

Figure 10:
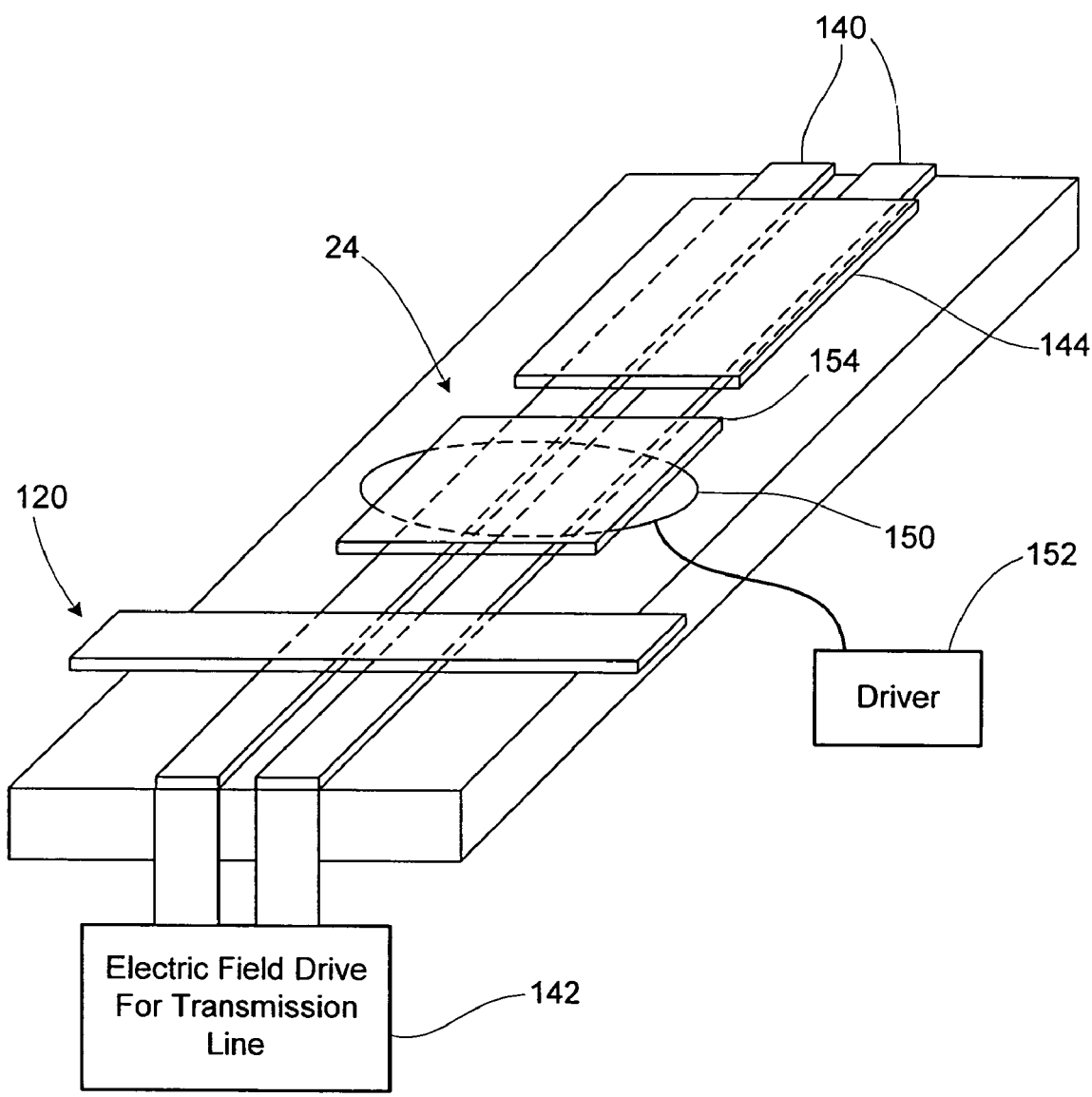
FIG. 10 is an oblique of an electrode configuration of a tester/reader that uses both magnetic and capacitive coupling.

FIG. 10 illustrates an electrode configuration 24 that has a electric-field coupling elements or electrodes 140 for capacitively coupling to an RFID device 120 and a magnetic-field coupling element or coil 150 for magnetically coupling to the RFID device 120. The elements 140 and 150 are coupled to respective drives 142 and 152 for providing suitable signals to the elements 140 and 150. The electrodes 140 may be used for interacting with the RFID device 120 for programming or otherwise transmitting information to the RFID device 120. Thus the electrodes 140 may be located and/or configured to have a relatively long duration interaction with the RFID device 120. The magnetic-field coupling element 150 may be used for a relatively short duration interaction with the RFID device 120, such as for testing operation of the RFID device 120.

A high dielectric constant material 144 may be placed in proximity to the electric-field coupling elements 142, to increase and/or concentrate capacitive coupling between the elements 142 and the device 120. The material 144 may be placed between the elements 142 and the device 120, or elsewhere in proximity to the elements. Aluminum oxide and titanium dioxide and are examples of suitable materials for the high dielectric constant material 144.

A high permeability material 154 may be placed in proximity to the magnetic-field coupling elements 152, to increase and/or concentrate magnetic coupling between the elements 152 and the device 120. The material 154 may be placed between the elements 152 and the device 120, or elsewhere in proximity to the elements. Ferrites are examples of suitable materials for the high permeability material 154.

It will be appreciated that use of high dielectric constant materials and high permeability materials is not limited to the embodiment shown in FIG. 10. That is, high dielectric constant materials and/or high permeability materials may also be used in conjunction with other of the embodiments disclosed herein.

It will be appreciated that systems with both magnetic and electric-field coupling may be used in other ways. One alternative approach would be to drive the magnetic field in such a way that it creates an anti-phase signal in an RFID device when the RFID device is close enough to the magnetic-coupling electrode. This may be used to specifically identify when an RFID device has finished coupling. This may be used to cease writing to an RFID device by electric-field coupling, and to trigger starting of a write or programming process for the next RFID device.

It will be appreciated that the configurations in the various embodiments may be combined in various suitable ways. For example, the various electrode configurations for capacitive coupling described above with regard to FIGS. 5-7 may be combinable with magnetic coupling devices, such as described above with regard to FIG. 9.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An RFID device preparation system comprising:
   a tester/reader for interacting with a plurality of RFID devices on a sheet or roll; and
   a printer for printing on a layer of the RFID devices;

wherein the tester/reader includes one or more reactive coupling elements that interact with the RFID devices through reactive coupling;

wherein the one or more reactive coupling elements include one or more electric-field coupling elements for interacting with the RFID devices through capacitive coupling by sending transmitted signals to the RFID devices and receiving return signals from the RFID devices, to be read, with each of the coupling elements both sending the transmitted signals and receiving the return signals.

2. The device of claim 1, wherein the one or more electric-field coupling elements include one or more electrodes coupled to a signal generator for reactively interacting with the RFID devices in any of a variety of orientations relative to the tester/reader.

3. The device of claim 2, wherein the one or more electrodes include multiple electrodes.

4. The device of claim 3, wherein the electrodes include a pair of L-shaped electrodes.

5. The device of claim 4, wherein the signal generator is configured to provide out-of-phase AC signals to the L-shape electrodes.

6. The device of claim 3, wherein the electrodes include pairs of electrodes angled relative to one another.

7. The device of claim 6,
wherein the signal generator is configured to selectively provide out-of-phase signals to two of the electrodes; and
wherein the two electrodes are selected based upon an orientation of the RFID devices relative to the electrodes.

8. The device of claim 6, wherein the electrodes include at least eight electrodes.

9. The device of claim 8, wherein the electrodes are substantially axisymmetrically spaced about a point.

10. The device of claim 2,
wherein the one or more electrodes include a partially-resistive electrode coupled to the signal generator at multiple drive points; and
wherein the signal generator is configured to vary phase and amplitude of signals sent to the drive points.

11. The device of claim 10, wherein the partially-resistive electrode is substantially rectangular.

12. The device of claim 11, wherein the drive points are at corners of the partially-resistive electrode.

13. The device of claim 2, wherein the tester/reader also includes a magnetic-field coupling element for magnetic coupling to the RFID devices.

14. The device of claim 13, wherein the magnetic-field coupling element includes a coil.

15. The device of claim 2, wherein the tester/reader further includes a high dielectric constant material in contact with the one or more electrodes.

16. The device of claim 15, wherein the high dielectric constant material is configured to be at least partially between the one or more electrodes, and the RFID devices, when the RFID devices are read.

17. An RFID device preparation system comprising:
a tester/reader for interacting with a plurality of RFID devices on a sheet or roll; and
a printer for printing on a layer of the RFID devices;
wherein the tester/reader includes one or more reactive coupling elements that interact with the RFID devices through reactive coupling;

wherein the one or more reactive coupling elements include one or more magnetic-field coupling elements for interacting with the RFID devices through magnetic coupling; and wherein the tester/reader further includes a high permeability material in contact with the one or more electrodes.

18. The device of claim 17, wherein the one or more magnetic-field coupling elements include a coil.

19. The device of claim 17, wherein the high permeability material is configured to be at least partially between the one or more electrodes, and the RFID devices, when the RFID devices are read.

20. A tester/reader for selectively interacting with one of a plurality of RFID devices on a sheet or roll, wherein the tester/reader comprises:
one or more electric-field coupling elements for interacting with the one of the RFID devices through capacitive coupling by sending transmitted signals to the RFID devices and receiving return signals from the RFID devices, to be read, with each of the coupling elements both sending the transmitted signals and receiving the return signals; and
a signal generator coupled to the one or more electric-field coupling elements;
wherein the one or more electric-field coupling elements are configured for capacitively interacting with the one of the RFID devices in any of a variety of orientations relative to the tester/reader while avoiding interaction with other of the RFID devices on the sheet or roll, thereby selectively limiting interaction between the tester/reader and the RFID devices on the sheet or roll.

21. The device of claim 20, wherein the one or more electric-field coupling elements include one or more electrodes.

22. The device of claim 21, wherein the one or more electrodes include multiple electrodes.

23. The device of claim 22, wherein the electrodes include a pair of L-shaped electrodes.

24. The device of claim 23, wherein the signal generator is configured to provide out-of-phase AC signals to the L-shape electrodes.

25. The device of claim 22, wherein the electrodes include pairs of electrodes angled relative to one another.

26. The device of claim 25, wherein the signal generator is configured to selectively provide out-of-phase signals to two of the electrodes; and wherein the two electrodes are selected based upon an orientation of the RFID devices relative to the electrodes.

27. The device of claim 25, wherein the electrodes include at least eight electrodes.

28. The device of claim 27, wherein the electrodes are substantially axisymmetrically spaced about a point.

29. The device of claim 21,
wherein the one or more electrodes include a partially-resistive electrode coupled to the signal generator at multiple drive points; and
wherein the signal generator is configured to vary phase and amplitude of signals sent to the drive points.

30. The device of claim 29, wherein the partially-resistive electrode is substantially rectangular.

31. The device of claim 30, wherein the drive points are at corners of the partially-resistive electrode.

32. The device of claim 21, wherein the tester/reader also includes a magnetic-field coupling element for magnetic coupling to the RFID devices.

33. The device of claim 32, wherein the magnetic-field coupling element includes a coil.

34. The device of claim 21, wherein the tester/reader further includes a high dielectric constant material in contact with the one or more electrodes.

35. The device of claim 34, wherein the high dielectric constant material is configured to be at least partially between the one or more electrodes, and the RFID devices, when the RFID devices are read.

36. The device of claim 15, wherein the high dielectric constant material includes one or more of aluminum oxide and titanium dioxide.

37. The device of claim 17, wherein the high permeability material is a ferrite.

38. The device of claim 1, wherein the tester/reader is operatively coupled to the printer such that information from the tester/reader is used to control printing on printable layers of the RFID devices.

39. The device of claim 38, wherein, for an RFID device that fails testing, the printer prints an indication that the RFID device that fails testing is not to be used.

* * * * *